Nov. 7, 1933.　　　F. H. GLEASON　　　1,934,053
LUBRICATING SYSTEM AND APPARATUS
Filed April 11, 1928　　2 Sheets-Sheet 1
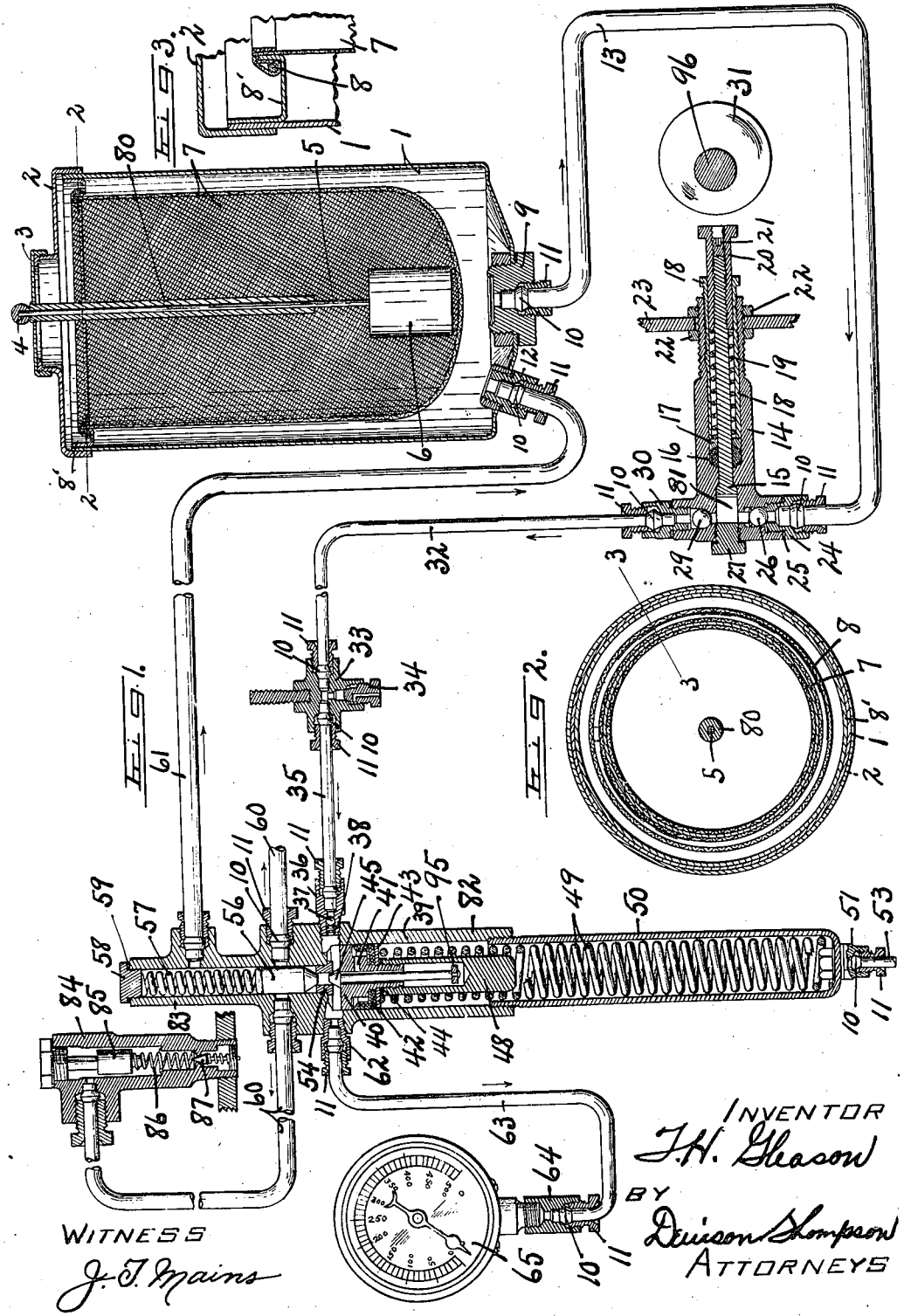
INVENTOR
F. H. Gleason
BY
Denison Thompson
ATTORNEYS
WITNESS
J. T. Mains

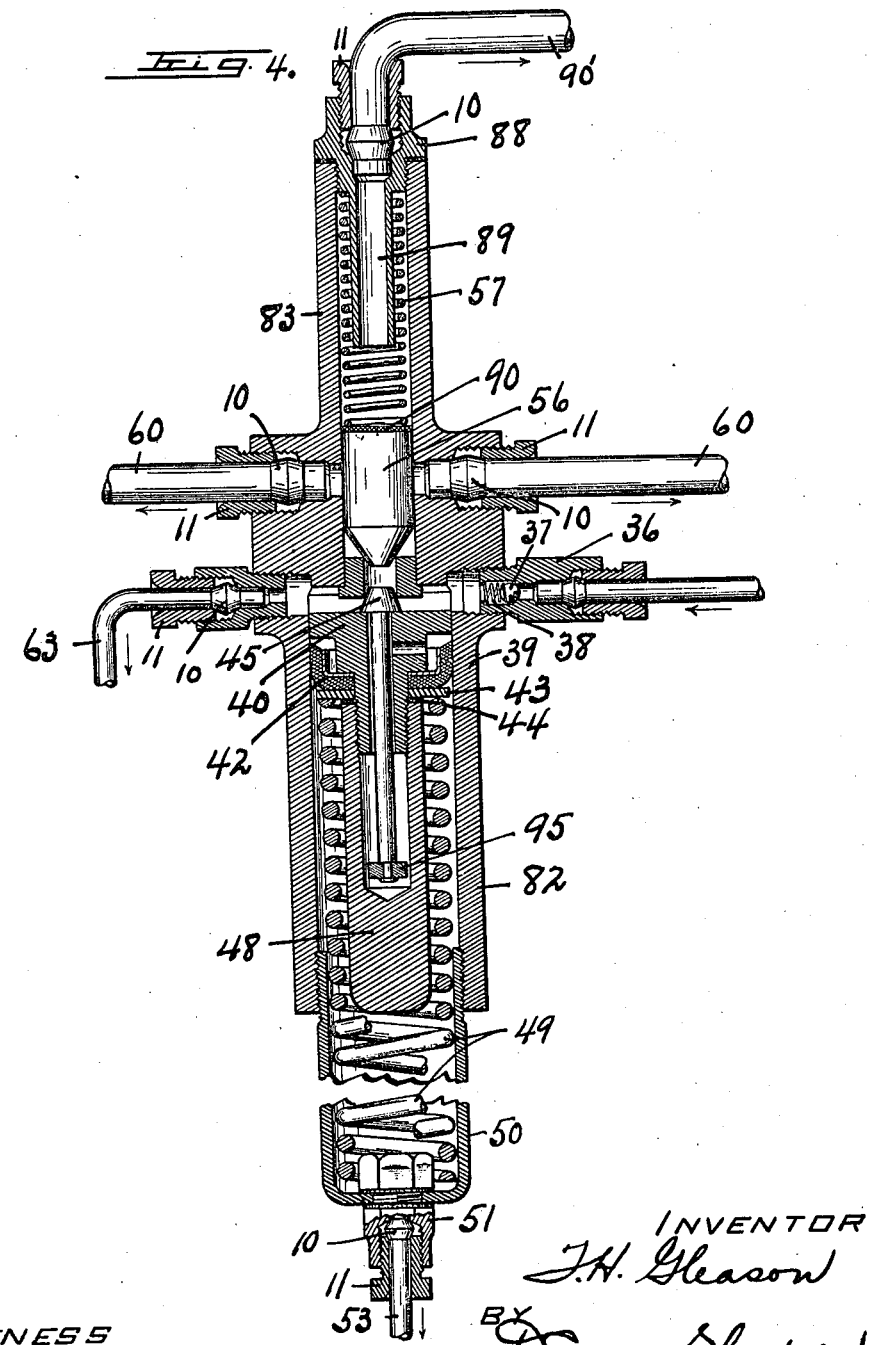

Patented Nov. 7, 1933

1,934,053

UNITED STATES PATENT OFFICE 1,934,053

LUBRICATING SYSTEM AND APPARATUS

Frederick H. Gleason, Auburn, N. Y., assignor to Bowen Products Corporation, Auburn, N. Y., a corporation of New York Application April 11, 1928. Serial No. 269,118

5 Claims. (Cl. 184—7)

This invention relates to certain new and useful improvements in lubricating system and apparatus, and more specifically to an automatic accumulator lubricating system adapted to be installed on machines or apparatus which require lubrication of their various parts at quite definite time intervals which can be determined by the number of revolutions of some rotating part of the machine.

The main object of the invention is to provide an efficient and automatic system and apparatus for forwarding at predetermined intervals a desired accumulated quantity of lubricant to a piping system including one or more control or metering devices which are adapted to supply the lubricant in substantially predetermined quantities to respective bearings, and further, to provide a structure which is adapted for use with and for effective actuation of a multiplicity of such measuring or control devices disposed at different points along the piping system.

Other objects and advantages relate to the details of the structure and the method of operation of the same, all as will more fully appear from the following description taken in connection with the accompanying drawings, in which:—

Figure 1 is a view largely in section of an apparatus of this invention.

Figure 2 is a section on line 2—2, Figure 1.

Figure 3 is a section on line 3—3, Figure 2.

Figure 4 is a sectional view of a slightly modified form of structure.

The apparatus as illustrated in Figures 1 to 3 comprises an oil reservoir 1 which may be a drawn steel shell provided with two tubing connections 9 and 12 at its bottom. A filter bag 7 is disposed within the shell 1 and its upper edge is held in any suitable manner for supporting the filter, as for instance by a snap ring 8 securing the edge of the bag to a flanged ring 8'. The flanged ring may be secured in any suitable manner within the upper edge of the shell 1. The oil reservoir includes a cover 2 which can be removed for the purpose of permitting insertion and removal of the filter 7.

The cover 2 is formed preferably at its central portion with a filler opening adapted to be closed by threading a cap 3 upon an externally threaded flange surrounding the central opening in the cover. The cover, as illustrated, supports a tube 80 through which the oil indicator rod 5 is movable as actuated by a float 6 within the oil reservoir. The upper end of the rod is provided with an oil indicator knob 4.

The oil supply tube 13 is connected to the tube connection 9 in any suitable manner, as by tubing sleeve 10 and tubing nut 11 which leads to one end of a pump body, or cylinder 14, the communication of tube 13 with the pump cylinder includes a ball check valve 26 adapted to seat upon the inner end of a valve seating member 24 threaded into the pump body 14 and the tube 13 may be connected to the valve-seating member 24 in any suitable manner, as by tubing sleeve 10 and tubing nut 11. The outlet from the pump cylinder or body 14 is likewise controlled by a ball check valve 29 seating against a portion of the wall of the pump body and maintained in position for seating by an outlet valve connection 30 to which outlet valve connection the tube 32 may be connected in any suitable manner, as by a tubing sleeve 10 and tubing nut 11.

One end of the pump body or cylinder may be closed as by a cylinder end plug 27.

The pump disclosed is designed as an adjustable stroke pump and the pump body 14 is held in desired position by the two adjusting and clamping nuts 22 adapted to be threaded upon the pump body and disposed upon opposite sides of a supporting bracket or wall 23. For full stroke of the pump, the pump body is moved toward cam 31 by properly adjusting the nuts 22 until the end of the piston or the end of the piston cam follower 20 touches the low side of the cam.

For shorter strokes the pump body is moved away from the cam the desired distance. The piston 15 has an enlarged head movable in the pump cylinder and its rear side may be tapered for seating engagement with a shouldered portion at the base of the cylinder, such seating engagement limiting the movement of the piston as actuated by return spring 19 mounted in the gland packing sleeve 18 having an adjustable threaded relation with the pump body 14. This packing sleeve is, as shown formed with a hexagonal head 18 facilitating adjustment of the sleeve for pressing the gland packing follower 17 against the piston gland packing to prevent leakage of lubricant.

The cam follower 20 is as shown, threaded upon the outer end of the piston 15 and is locked in desired position by means of a blind set screw 21. The sleeve 18 should be adjusted sufficiently tight to prevent leak of oil through gland 16 and still permit the return of the piston assembly as actuated by the spring 19 mounted within the tube 18 and having one end bearing against the gland packing follower 17 and its other end bearing against the end of the piston cam follower 20.

Oil is supplied to the cylinder by flow from reservoir 1 past check valve 26 into the cylinder 81 and upon actuation of the piston 15 by rotation of cam 31 the oil or lubricant contained in the cylinder 81, or a portion of such lubricant, dependent upon the length of the stroke of the piston, will be ejected from the cylinder past check valve 29 and into the tube 32. The cam 31 may be mounted upon any rotating portion of the machine or apparatus for actuating the pump, as described.

The tube 32 leads to a T-fitting 33 provided with an air vent plug 34 so arranged that by rotation of the plug 34 a short distance, the apparatus may be vented of air. The tube 32 may be connected to fitting 33 in any suitable manner, as by tubing sleeves 10 and tubing nut 11. A tube 35 leads from the fitting 33 to the accumulator assembly, and this tube may be connected to fitting 33 in any suitable manner, as by tubing sleeve 10 and tubing nut 11, and the opposite end of tube 35 may be connected to an inlet check body 36 as by a tubing sleeve 10 and tubing nut 11, such inlet check body 36 including an inlet ball check 37 normally held by spring 38 against a shouldered seat within the body 36 so that the check valve is opened by pressure of lubricant in tube 35.

The check body 36 may be secured to the accumulator cylinder body 39 by threading one end of the inlet check body into an internally threaded opening in the accumulator body 39 to bring the tube 35 into communication with the accumulator chamber within the accumulator body 39.

The accumulator assembly includes an oil storage cylinder 82 and disposed within this cylinder 82 is a piston assembly supported by a powerful spring 49. The piston assembly comprises a piston guide 40 of tubular form and shouldered upon its exterior, and the leather cup-washer 42 has its inner edge confined against the base of the shoulder by means of a steel washer 43 clamped in position by a valve guide and nut 48 threaded upon the piston guide 40. One end of the spring 49 bears against the surface of the washer 43, and the other end of the spring rests against the interior of the confining casing 50 which may be threaded into the lower end of the cylinder 82 so as to form a shoulder within the cylinder against which the washer 43 will contact in its downward movement to limit the movement of the piston assembly. The lower end of case 50 may be provided with a drain tube 53 secured to drain tube connection 51 in any suitable manner, as by tubing sleeve 10 and tubing nut 11, such drain tube constituting means for discharging from the case 50 any liquid that might by-pass the piston assembly.

The nut 48 is formed with an internal chamber within which the stem of valve 45 is adapted to move, and this stem is loosely and slidably mounted in the piston guide 40 and has its valve portion adapted to rest against the upper surface of the guide 40 for seating against a valve seat formed in a removable valve collar 54 which may be pressed into the cylindrical portion 83 of the accumulator body 39. A copper gasket 44 may be interposed between washer 43 and the adjacent end of the nut 48. The piston guide 40 is formed with a radial conduit 41 leading from the exterior of the guide to the passageway or conduit through which the stem of valve 45 moves to allow hydraulic pressure free access to the chamber in the nut 48 and within which chamber the lower end of the valve stem of valve 45 moves.

A gauge 65 may be connected by tube 63 to a tube connection fitting 62 as by means of tubing sleeve 10 and tubing nut 11, the tube connection fitting 62 being threaded into an internally threaded opening in the accumulator body 39 to bring the gage in communication with the cylinder 82.

The outlet valve 56 from the accumulator chamber 82 is adapted to seat against the upper edge of the valve collar 54 and its stem is in the form of a cylinder movable within cylinder 82 and preferably it has a slight clearance, as for instance .002 in its movement in the cylinder upwardly to the point where it reaches the center of the outlet ports leading to the tubes 60. Above this point the interior of the cylinder 83 is slightly enlarged so as to increase somewhat the clearance between valve 56 and the wall of the cylinder 83. For illustration, the cylinder 83 may be ½" diameter from its lower end at the collar 54 to the center of the outlet ports leading to the tube 60. Above this point the cylinder may be .505 of an inch in diameter, thereby providing an additional clearance of .005 to permit oil flow between valve 56 and the cylinder, more particularly after the valve has passed the center of the ports leading to the tube 60.

Any number of tubes 60 may be provided connected with suitable ports leading from the cylinder 83. As illustrated, two ports are shown and two tubes 60 and these tubes may be connected to the cylinder in any suitable manner, as by tubing sleeve 10 and tubing nut 11. The valve 56 is backed up by an outlet valve spring 57, one end of which bears upon the rear end of the valve and the other end of which is in contact with outlet valve cylinder end plug 58 which may be threaded into the upper end of cylinder 83, gasket 59 being interposed between the upper end of the cylinder and the flange upon the plug to form a lubricant-tight joint.

An oil relief return tube 61 is connected to the cylinder 83 above the outlets leading to tube 60 in any suitable manner as by tubing sleeve 10 and tubing nut 11 and leads to the oil return tube connection 12 to which it may be secured in any suitable manner, as by tubing sleeve 10 and tubing nut 11.

In Figure 1 there is shown a control or metering device connected to one of the tubes 60 for supplying a measured quantity of lubricant to a bearing. This control device is of the type shown in my copending application Serial No. 150,245 but the apparatus of this invention contemplates the assemblage of a multiplicity of control devices with each of the pipes 60. The control device shown comprises a cylinder 84 containing a piston 85 slightly smaller than the interior diameter of the cylinder to permit lubricant to bypass the piston. The piston is normally held in its uppermost position by spring 86 and the outlet from the cylinder may be closed by a spring-pressed valve 87.

A general description of the control device disclosed is given with the understanding that various forms and constructions of control or metering devices are adapted for use with the apparatus of this invention.

In Figure 4 a slightly modified form of structure is disclosed for use particularly with control devices which do not require that the pressure in the supply line be relieved in order that the control device may repeatedly function to supply charges of lubricant to a bearing.

In this disclosure the plug 88 which closes the upper end of the cylinder 83 is of tubular form and is provided with a depending tube or cylinder 89 of considerably less external diameter than the internal diameter of cylinder 83 and the spring 57 may surround the cylinder 89. A tube 90' may be connected to the plug 88 for communication with the interior of cylinder 89, as by tubing sleeve 10 and tubing nut 11. The upper end of valve 56 may be provided with a gasket 90 adapted to contact with the lower end of tube or cylinder 89 to form a fluid-tight joint.

When valve 56 of the accumulator assembly opens, it is carried upwardly to bring gasket 90 into contact with a seat at the lower end of the tube 89 and the oil displaced by upward travel of valve 56 is forced outwardly through tube 90' and back to the oil reservoir 1. In this construction gasket 90 remains against the lower end of tube 89 until the total volume of the accumulator cylinder or chamber is forced through tubes 60 to the control devices, after which operation the system starts another cycle.

The operation of the structure shown in Figure 1 may be generally outlined as follows:—

When the lubricating system is assembled, as illustrated, and the reservoir filled with oil, the pump is first operated by the cam 31 with the air relief plug 34 in a position to permit the escape of air from the system. When the air has been vented from the system, the plug 34 can be moved to closed position and the operation of the pump by cam 31 will force small charges of lubricant into the accumulator cylinder 82, depressing the piston assembly of the accumulator. During this time the valve 45 remains closed against its seat on collar 54 and this valve will remain in closed position until the accumulator piston, including the cup-leather 42 has been forced down by lubricant entering the accumulator for approximately half its stroke, at which time the lower end of the guide 40 will come into contact with the collar 95 on the lower end of the stem of valve 45, causing valve 45 to move from its seat to open position, whereupon the valve will fall to its lowermost position.

The hydraulic pressure existing in the accumulator cylinder 82 is now held by the valve 56 and this valve, as before stated, has a close fit in the lower end of the cylinder 83 and is held to its seat by spring 57, and in one desired arrangement the parts are so related that it requires approximately 325 pounds to start to open the valve 56.

When the accumulator cylinder 82 is filled with oil, the washer 43 on the piston assembly comes into contact with the upper end of spring case 50 and the next stroke of the small pump as actuated by cam 31 will raise the pressure in the accumulator cylinder very suddenly. As the pressure in the accumulator cylinder approaches or passes 325 pounds, the valve 56 starts to leak oil, and this oil passes into the space above the valve seat and acts upon the entire diameter of the valve, causing the valve to move up in cylinder 83 until spring 57 is compressed solid, and a free passage is provided for the oil in the accumulator cylinder 82 to the outlet tubes 60 without any reduction in the pressure developed by the accumulator.

In a specific embodiment, a pressure of approximately 70 pounds acting on the entire diameter, as for instance, ½" of the upper valve, will compress the spring above it solid and the lower part of the valve will be above the outlet passages leading to tube 60. The oil is forced from the accumulator cylinder 82 by the action of spring 49 below the accumulator piston assembly, and through the tube 60 to the control or measuring devices until these devices have delivered all of the volume for which they are adjusted. The excess volume of oil over that required by the measuring devices then passes through the clearance between valve 56 and cylinder 83 and into the return oil tube 61 by means of which it is conveyed to the oil reservoir. When the accumulator piston assembly reaches the top of cylinder 82 the valve 45 returns to its seat on collar 54 and the cycle is complete. The valve 45 in the piston assembly prevents the pulsing action caused by the supply of oil from the adjustable stroke small pump from preventing the valve 56 returning to its seat, and valve 45 cuts off the pressure from the valve 56 until the accumulator piston assembly has completed substantially half of its downward stroke.

In the particular installation, here described, the gauge 65 connected to the accumulator cylinder indicates by a slow movement of its pointer when the small pump is delivering oil to the accumulator. At the beginning of the downward movement of the accumulator piston the gauge will read about 200 pounds, the pressure shows a gradual rise from the point to approximately 325 pounds, whereupon the pressure rises suddenly to approximately 400 pounds, at which time the accumulator delivers its oil to the supply tube 60 and the gauge then drops to approximately 175 pounds, and maintains this pressure until the valve 45 in the accumulator piston assembly closes the oil outlet through collar 54 and then the gauge jumps to 200 pounds at the start of another operation.

With this particular embodiment, approximately 2 cu. in. of oil under about 175 pounds pressure per square inch are delivered by the accumulator at each operation. With an operating shaft 96 turning 50 R. P. M., the small pump actuated thereby can be adjusted to give a time interval of from five minutes to four and one-half hours for operation of the accumulator, but it is obvious that the pump may be operated at various speeds, and may be of various capacities, as desired, altho comparatively low speeds are preferable, and altho I have shown and described a specific construction of apparatus, together with details of form, construction and arrangement of the parts thereof, I do not desire to restrict myself to the same, as various changes and modifications may be made within the scope of the appended claims.

I claim:

1. In a lubricating system, a source of lubricant, a pump adapted to receive lubricant from said source, an accumulator device adapted to receive and retain a plurality of charges of lubricant from said pump, means for discharging the lubricant from the accumulator when a predetermined quantity is stored in the accumulator, control devices for supplying lubricant to individual bearings and adapted to intermittently receive lubricant from the accumulator device, said accumulator device including a cylinder, a reciprocating valve at the entrance thereto having cylinder wall clearance for by passage of excess lubricant, and means for returning excess lubricant from the accumulator device to the source of lubricant.

2. In a lubricating system, a source of lubricant, a pump adapted to receive lubricant from said source, an accumulator device adapted to receive and retain a plurality of charges of lubricant from said pump, means for discharging the lubricant from the accumulator when a predetermined pressure of lubricant in the accumulator is reached, control devices for supplying lubricant to individual bearings and adapted to intermittently receive lubricant from the accumulator device, said accumulator device including a cylinder, a reciprocating valve at the entrance thereto having cylinder wall clearance for by passage of excess lubricant, and means for returning excess lubricant from the accumulator device to the source of lubricant.

3. A lubricating system comprising a source of lubricant, an accumulator device, a pump receiving lubricant from the source and forwarding it to said accumulator device under pressure, an outlet from the accumulator device, a valve normally closing said outlet and having a comparatively small portion of its surface area exposed through the outlet, a tube in which said valve is movable with slight clearance whereby relatively high pressure is required to initiate the opening of the valve but when opening has been initiated a comparatively low pressure will force continued movement of the valve due to the increased surface area exposed to the pressure.

4. In a lubricating system, a source of lubricant, a pump receiving lubricant from said source, an accumulator device receiving lubricant from said pump and including an accumulator chamber adapted to receive and retain a plurality of cycle charges from said pump, a piston assembly movable in the accumulator chamber, a spring for actuating the piston assembly to eject lubricant from the accumulator chamber when a predetermined lubricant pressure is reached, an outlet from the accumulator chamber, a valve controlling said outlet, a valve chamber in which said valve is movable with slight clearance for a distance after leaving its seat, and then with somewhat increased clearance for an additional distance and a conduit for the return of excess lubricant to lubricant source and connected to the area of increased valve clearance of the valve chamber.

5. In a lubricating system, a source of lubricant, a pump receiving lubricant from said source, an accumulator device receiving lubricant from said pump and including an accumulator chamber adapted to receive and retain a plurality of cycle charges from said pump, a piston assembly movable in the accumulator chamber, a spring for actuating the piston assembly to eject lubricant from the accumulator chamber when a predetermined lubricant pressure is reached, an outlet from the accumulator chamber, a valve controlling said outlet, a valve chamber in which said valve is movable with slight clearance for a distance after leaving its seat and then with somewhat increased clearance for an additional distance and a conduit for the return of excess lubricant to lubricant source and connected to the area of increased valve clearance of the valve chamber, and spring means normally maintaining said valve seated.

FREDERICK H. GLEASON.